US008713139B1

(12) United States Patent
Kasper et al.

(10) Patent No.: US 8,713,139 B1
(45) Date of Patent: Apr. 29, 2014

(54) AUTOMATIC FIXUP OF NETWORK CONFIGURATION ON SYSTEM IMAGE MOVE

(75) Inventors: Charles C. Kasper, Tomball, TX (US);
Brian Harrison, Scotts Valley, CA (US);
Kenneth C. Avery, Houston, TX (US);
Craig A. Boeker, Spring, TX (US);
Charles K. Whitsett, Houston, TX (US); Richard L. Mouser, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1042 days.

(21) Appl. No.: 12/588,844

(22) Filed: Oct. 29, 2009

(51) Int. Cl.
*G06F 15/177* (2006.01)

(52) U.S. Cl.
USPC ............................................. 709/221

(58) Field of Classification Search
None
See application file for complete search history.

(56) References Cited

U.S. PATENT DOCUMENTS

| | | | | |
|---|---|---|---|---|
| 6,718,383 | B1 * | 4/2004 | Hebert | 709/224 |
| 7,039,008 | B1 * | 5/2006 | Howes et al. | 709/220 |
| 7,188,003 | B2 * | 3/2007 | Ransom et al. | 700/286 |
| 7,246,200 | B1 * | 7/2007 | van Rietschote et al. | 711/114 |
| 7,356,679 | B1 * | 4/2008 | Le et al. | 713/1 |
| 7,565,517 | B1 * | 7/2009 | Arbon | 713/1 |
| 7,788,350 | B2 * | 8/2010 | Ferri et al. | 709/220 |
| 7,849,168 | B2 * | 12/2010 | Utsunomiya et al. | 709/221 |
| 7,886,185 | B1 * | 2/2011 | Okcu et al. | 719/328 |
| 7,941,510 | B1 * | 5/2011 | Tormasov et al. | 709/220 |
| 8,060,760 | B2 * | 11/2011 | Shetty et al. | 713/300 |
| 8,099,521 | B2 * | 1/2012 | Reed | 709/250 |
| 8,307,127 | B1 * | 11/2012 | Zeng et al. | 710/7 |
| 2003/0023785 | A1 * | 1/2003 | Funato et al. | 710/38 |
| 2004/0088466 | A1 * | 5/2004 | Tang et al. | 710/303 |
| 2005/0036034 | A1 * | 2/2005 | Rea et al. | 348/207.1 |
| 2005/0190703 | A1 * | 9/2005 | Sumimoto | 370/252 |
| 2005/0249203 | A1 * | 11/2005 | Huang | 370/389 |
| 2006/0074957 | A1 * | 4/2006 | Yamamoto et al. | 707/101 |
| 2006/0259723 | A1 * | 11/2006 | Petruzzo | 711/162 |
| 2007/0245110 | A1 * | 10/2007 | Shibayama et al. | 711/165 |
| 2008/0043732 | A1 * | 2/2008 | Desai et al. | 370/389 |
| 2008/0059556 | A1 * | 3/2008 | Greenspan et al. | 709/201 |
| 2008/0104369 | A1 * | 5/2008 | Reed | 712/28 |
| 2008/0162800 | A1 * | 7/2008 | Takashige et al. | 711/104 |
| 2008/0205377 | A1 * | 8/2008 | Chao et al. | 370/351 |
| 2008/0259929 | A1 * | 10/2008 | Mraz | 370/395.1 |
| 2008/0298274 | A1 * | 12/2008 | Takashige et al. | 370/254 |
| 2009/0157851 | A1 * | 6/2009 | Dake et al. | 709/220 |
| 2010/0257269 | A1 * | 10/2010 | Clark | 709/226 |
| 2011/0072119 | A1 * | 3/2011 | Bronstein et al. | 709/222 |
| 2011/0275377 | A1 * | 11/2011 | Wu et al. | 455/436 |

\* cited by examiner

*Primary Examiner* — Ninos Donabed (57) ABSTRACT

A method and device provide for automatically reconfiguring a computer network in response to an operating system image migration from a first hardware platform to a second hardware platform. The method includes detecting a boot up command and in response, initializing a fix up utility, creating a new network configuration for the migrated operating system image and storing the new network configuration information; reading the new network configuration information and old network configuration information corresponding to the first hardware platform; determining if any of the new network configuration information corresponds to a new network interface controller and if any of the old network information corresponds to a non-assigned network interface controller; and if any of the old network configuration information corresponds to a non-assigned network interface controller, reassigning network interface controller identifiers from the old network configuration information to the new network interface controller.

17 Claims, 7 Drawing Sheets

AUTOMATIC FIXUP OF NETWORK CONFIGURATION ON SYSTEM IMAGE MOVE

BACKGROUND

A computer network may comprise multiple separate computing platforms or servers. Each server may host one or more operating systems. When an operating system image is moved from one server to another server, the operating system detects the changed hardware and sets the computer network to a default configuration. The default configuration may not be the desired configuration for the computer network. To restore the configuration, current system require a user to execute a number of manual steps or processes.

DESCRIPTION OF THE DRAWINGS

The detailed description will refer to the following drawings in which like numbers refer to like objects, and in which:

FIGS. 3A-6B illustrate various migration scenarios; and

DETAILED DESCRIPTION

A computer network may comprise multiple separate computing platforms or servers. Each server may host one or more operating systems. The instance of an operating system on a physical machine or server or on a virtual machine sometimes is referred to as an operating system image. The operating system image then is just the state of the operating system as stored in a non-volatile form. When an operating system image is moved from one server to another server, the operating system detects the changed hardware and sets the computer network to a default configuration. The default configuration may not be the desired configuration for the computer network. In fact, mobility of server workloads, especially operating system instances, from one hardware platform to another is hampered by the fact that most operating systems are configured, at initial install time, for the specific hardware platform on which they are initially installed. Configuration settings such as IP addresses or storage identifiers, may be bound to specific hardware platforms whose "names" may change. For example, a "red" subnet may be attached to a first hardware port on one server and a third hardware port on another server.

Ideally, following an image migration, the operating system and underlying applications maintain the same feature functionality. The operating system image may migrate between physical (hardware) platforms (e.g., blades) and/or virtual machines. That is, the images may migrate from physical platform to physical platform, virtual platform to physical platform, virtual platform to virtual platform, and from physical platforms to virtual platforms. During these migrations, anomalies may arise when network hardware addresses and configurations change.

A network interface card, network adapter, network interface controller (NIC), network interface card, or LAN adapter is a computer hardware component designed to allow computers to communicate over a computer network. The NIC is both an OSI layer 1 (physical layer) and layer 2 (data link layer) device, as it provides physical access to a networking medium and provides a low-level addressing system through the use of Media Access Control (MAC) addresses.

A Media Access Control address is a unique identifier assigned to most NICs by the manufacturer for identification, and is used in the MAC protocol sublayer. If assigned by the manufacturer, a MAC address usually encodes the manufacturer's registered identification number.

An orphaned NIC has a MAC address but no network configuration assigned.

In order to maintain the same functions and features following a migration, a fix up utility installed on each platform maintains a record of configuration information. Such information includes, for example, the MAC address history for each network interface and other information needed to provide a record of previous configuration assignments. The configuration information may be obtained from information contained in a separate file, in a registry, or in files distributed among hardware and software devices, depending on the operating system architecture. In all three examples, the configuration information is provided in a file associated with the operating sstem image.

Figure 2A:
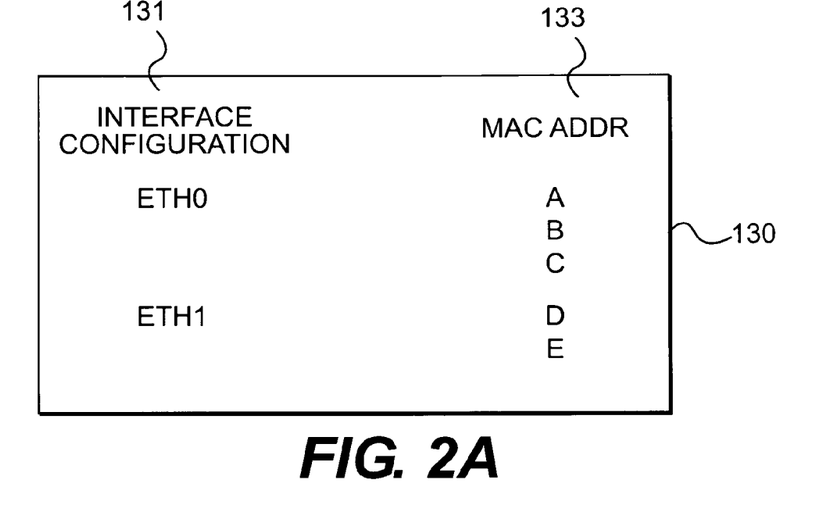
FIGS. 2A and 2B are conceptual illustrations of a migration file created and maintained by the utility of FIG. 1.
Figure 2B:
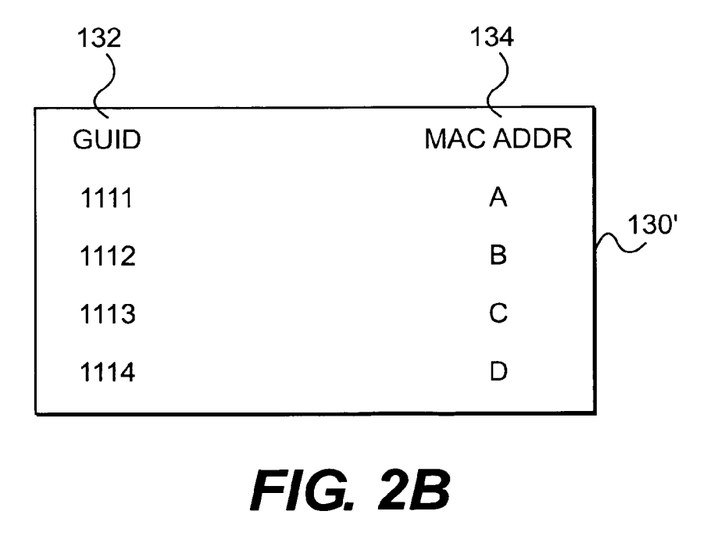

In an embodiment, selected configuration information also is maintained in a separate migration file (see FIG. 2) created by the fix up utility, when the fix up utility is installed. The file automatically updates on every system boot if the fix up utility performs network configuration migration updates.

Some operating systems us a registry to store information and settings for hardware, operating system software, most non-operating system software, and per-user settings. The fix up utility can query this registry to obtain configuration information for the NICs. In other operating systems, the configuration information, such as MAC addresses, is kept only with local hardware devices and software. With these operating systems, the fix up utility directly queries the appropriate hardware and software to obtain the configuration information. In still other operating systems, the configuration information is kept in one or more separate files or directories. With any of these operating systems, the fix up utility extracts the relevant configuration information from whatever storage architecture is used by the operating system.

The fix up utility operates on NIC configurations and does not modify application settings because correctly updating the NIC configurations should allow the applications to continue to operate as desired in the migrated environment. The utility includes an executable that runs during system boot, preferably between the time the operating system configures the NICs and the time the network starts. If run during boot is not possible, then the executable runs after boot to update the NIC configurations and restart the network with the updated configuration.

The fix up utility allows a user to modify MAC assignment to NIC configuration. This manual update applies so that when existing migration configurations are modified, the corresponding changes can be made to a configuration file to avoid undoing user changes or losing configurations. In an embodiment, a user interface instructs the user on how to manually edit the migrate file and run the fix up utility executable.

The fix up utility does not rely on any resident monitoring under the assumption that the system configuration at the time of shutdown (and therefore the next system startup) is good. If a user makes manual changes to the NIC configurations, those configurations will be present at the next boot—possibly as backup/orphan configurations if the hardware has changed but still is present.

Upon every system boot, the fix up utility reads the network configuration for each NIC. If there are no backup/orphan configurations present, this read operation will indicate that the system booted correctly with the current NIC configuration. This current NIC configuration then will be recorded and the configuration file updated to reflect the current configuration. However, if a "move trigger" is detected, the fix up utility will execute a migration algorithm to update and record the NIC configuration.

For example, with Linux-based systems, the fix up utility scans a network configuration directory looking for ifcfg-ethX.bak files. If a ifcfg-ethX.bak file exists, the fix up utility assumes a change in the NIC that was assigned to the ifcfg-ethX file. In this scenario, the operating system will have backed up the network configuration in the ifcfg-ethX.bak file and created a new file named ifcfg-ethX using DHCP as the default boot protocol for that NIC. Thus, the existence of this backup file is the trigger that indicates the image has been moved.

With Windows®-based systems, the fix up utility scans the network configurations contained in a registry looking for orphaned NICs, the existence of which is the indicator that Windows has detected a change in the network controller that was assigned to a particular network configuration indicating the hardware has changed.

Figure 1:
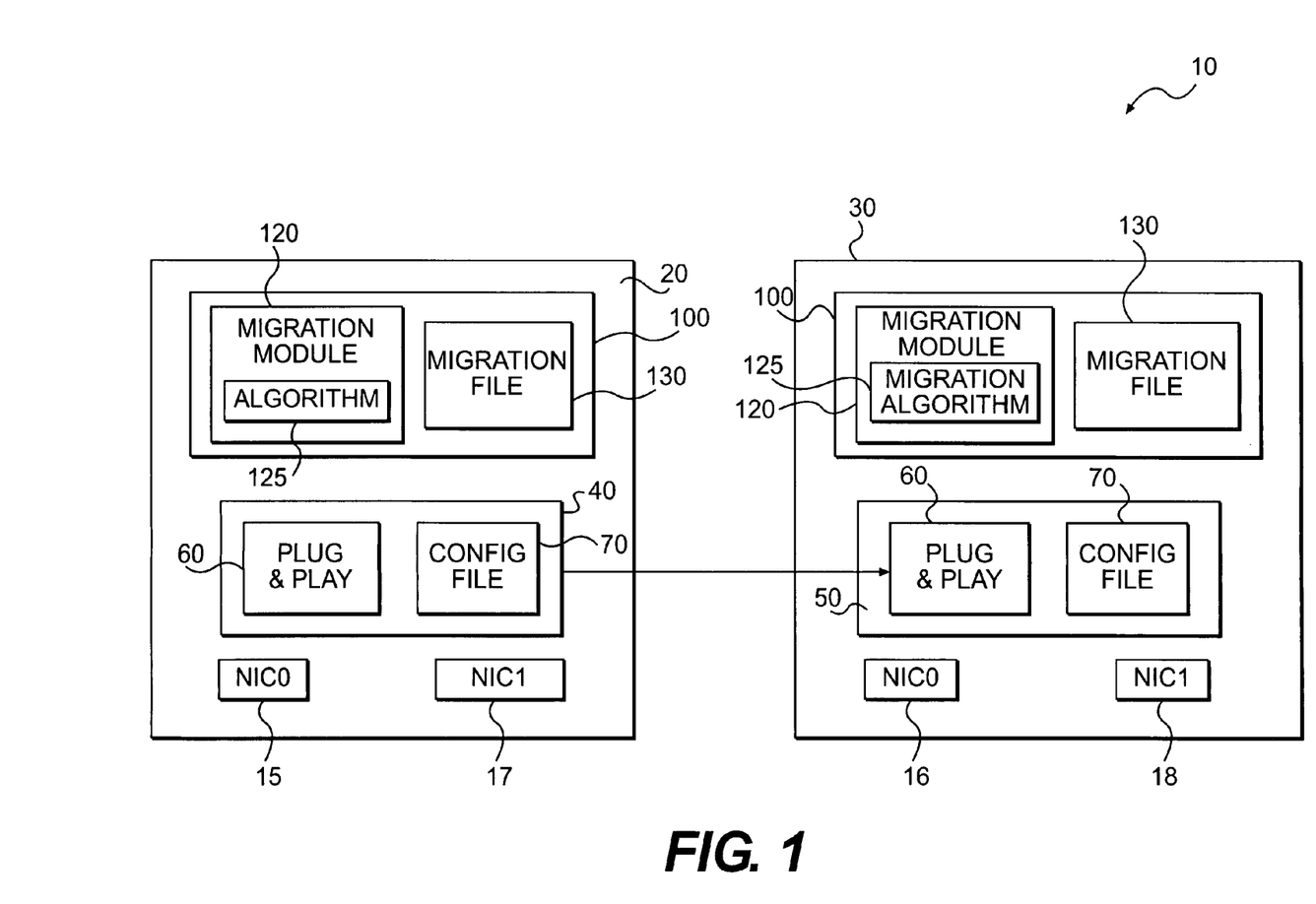
FIG. 1 is a block diagram illustrating a computer network implementing an exemplary fix up utility that maintains a network configuration following a system image move.

FIG. 1 illustrates a networked computer system that implements an exemplary fix up utility that may be used to maintain network configurations following an operating system image migration. In FIG. 1, computer system 10 includes multiple physical servers, each hosting at least one operating system. For ease of illustration, physical server 20 is designated a source server, and physical server 30 is designated a target server. Source server 20 includes NICs 15 and 17 (i.e., NIC0 and NIC1). Target server 30 includes NICs 16 and 18 (NIC0 and NIC1). Operating system image 40 is hosted on the source server 20, but is scheduled to migrate to the target server 30. Following the migration, the migrated operating system image, now designated by the reference number 50, will boot up on the target server 30. A plug and play utility 60, which may be part of the operating system image 50, identifies NICs, provides unique identifiers for the NICs, and assigns drivers for the NICs. When the operating system image 40 boots on a target server 30, certain hardware devices on the target server 30 may have addresses or identifiers different from those on the source server 20. Ordinarily, the plug and play utility 60 would detect these hardware changes and attempt to configure them.

For example, the plug and play utility 60 may implement a Dynamic Host Configuration Protocol (DHCP), which largely automates network-parameter assignment to network devices from one or multiple, fault-tolerant DHCP servers. When a DHCP-configured server connects to a network, the utility 60 sends a broadcast query requesting necessary information from a separate DHCP server (not shown) on the network. The separate DHCP server manages a pool of IP addresses and information about client configuration parameters such as default gateway, domain name, the DNS servers, other servers such as time servers. On receiving a valid request, the separate DHCP server assigns the server an IP address, a lease (length of time the allocation is valid), and other IP configuration parameters, such as the subnet mask and the default gateway. The query is typically initiated immediately after booting, and must complete before the client can initiate IP-based communication with other hosts.

To avoid a default reconfiguration of the computer system, such as to the DHCP-provided IP addresses, fix up utility 100 allows for detection and re-application of the network configuration as it existed prior to the migration. As part of the utility 100 a migration module 120 includes migration algorithm 125 that extracts configuration information from the operating system. As an example, this configuration information is retained in config. file 70. By using the config. file information, the fix up utility 100 permits increased mobility, which allows users to reduce planned downtime, rapidly recover from hardware failures and disasters, and optimize the use of server, power, and cooling resources.

The fix up utility 100 optionally includes image migration log file 130, which contains a running historical log of the utility's operating narrative. The file 130 may be formatted with single line entries that are easily parsed, including, date, time, entry type and a descriptive string to follow the comma separated preformatted data.

To abstract the physical characteristics of the host physical server, the utility 100 includes a migration module 120 that, when executed operates in effect to detect a change in the network configuration when the operating system image is moved, and apply the prior configuration (i.e., a backed-up configuration retained in the config. file 70) to the new target server 30. The utility 100 functions automatically (i.e., without any user interaction) to determine which configuration belongs to which NIC. The utility 100 uses the NIC MAC addresses, which usually are hardware-specific and which ordinarily are not preserved when the operating system image is moved. The utility 100 stores the MAC addresses used on the source server 20, and associates those MAC addresses with the current network configuration. Every time the operating system image boots, the utility 100 checks to see if new NICs have been detected. If new NICs have been detected, their MAC addresses are used to find and apply existing configurations. In this way, the utility 100 is able to cope with NIC ordering changes allowing for a network connection to move from NIC 15 to NIC 16, for example.

FIGS. 2A and 2B are a conceptual diagram of the migration file created by the fix up utility 100. In FIG. 2A, configuration file 130 includes an interface configuration 131 (e.g., ETH0) and a corresponding MAC address 133. The configuration file 130 may be implemented for use with certain versions of the Linux operating system. FIG. 2B shows configuration file 130', which may be implemented with Windows®-based operating systems. The configuration file 130' includes GUID 132, which leads to a specific configuration, and MAC address 134. NICs that are orphaned will have no configuration information assigned.

The fix up utility 100 also functions to update network configurations when the MAC address is not preserved, such as when an operating system image is moved from a physical machine to a virtual machine. In this situation, a virtual machine monitor on the target physical machine (i.e., hosting the virtual machine) may allocate MAC addresses. When this occurs, the utility 100, as before, may operate so as to reconfigure the network identifiers assigned by the virtual machine monitor to correspond to the network configuration as it existed on the source server.

The utility 100 also allows for repetitive migrations, for example from a first hardware platform to a second hardware platform, and back, while preserving the same NIC identifiers. In fact, since the config. File 70 (and the migration file 130) maintain past network configuration information, in the event of a migration of the operating system image 50 back to the source server 20, the original network configurations for NICs 15 and 17 will be applied by the operating system image itself, and operation of the fix up utility may not be needed.

As noted above, when the operating system first boots, the fix up utility 100 scans network configurations (in a registry, in a config file, or in distributed files) looking for orphaned NIC configurations, i.e., configurations without associated hardware. Orphaned NICs are an indication to the operating system that a migration has occurred and that the network configuration for a NIC has been set to its default DHCP setting. The fix up utility 100 makes decisions based on comparing the orphaned network configurations to the new network configurations automatically assigned by the operating system, and comparing the NIC to MAC address relationships stored in the fix up utility migration file 130. The fix up utility 100 includes migration algorithm 125 that addresses at least three possible migration scenarios: 1) physical to physical, 2) physical to virtual, and 3) virtual to physical. An exemplary migration algorithm is presented below, and then is illustrated and explained with respect to FIGS. 3A-6B.

```
while (NIC) {
    if (NIC ORPHANED) {
        if (NIC (MAC)= =NIC (MAC)) {
            NIC (CONFIGURATION)=NIC (ORPHANED
                NIC CONFIGURATION
        } else if (NIC (MAC SWAPPED)) {
            NIC (CONFIGURATION)=(MAC SWAPPED
                ORPHANED NIC)
        } else if (NIC (MAC ONLY IN MIGRATE.XML
            FILE) {
            NIC (CONFIGURATION)=NIC (MIGRATE
                FILE MAC ORPHANED NIC)
        } else {
            NIC (CONFIGURATION)=NIC (ORPHANED
                NCI CONFIGURATION)
        }
    }
}
```

Figure 3A:
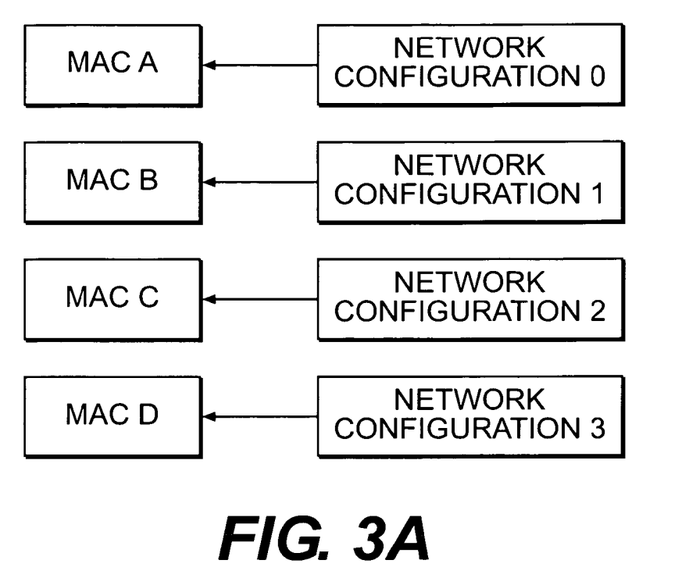
Figure 3B:
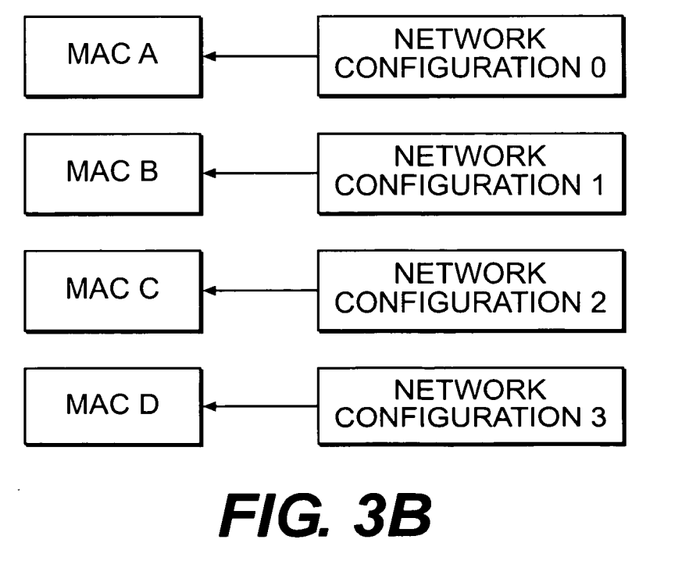

FIGS. 3A and 3B illustrate the situation in which the operating system detects. a NIC change. Even though the NICs have the identical MAC addresses, this is an indication that the operating system has migrated from one operating environment to another with a similar network controller. The utility 100 will first read the network configuration setting that the fix up utility 100 backed up in the migration file 130. Next, the utility 100 will apply the backed up network configuration to the operational network configuration and delete the operating system's backed up network configuration for that NIC. As can be seen in FIGS. 3A and 3B, the network configurations remain the same, before and after the migration, and after the fix up utility 100 operates.

Figure 4A:
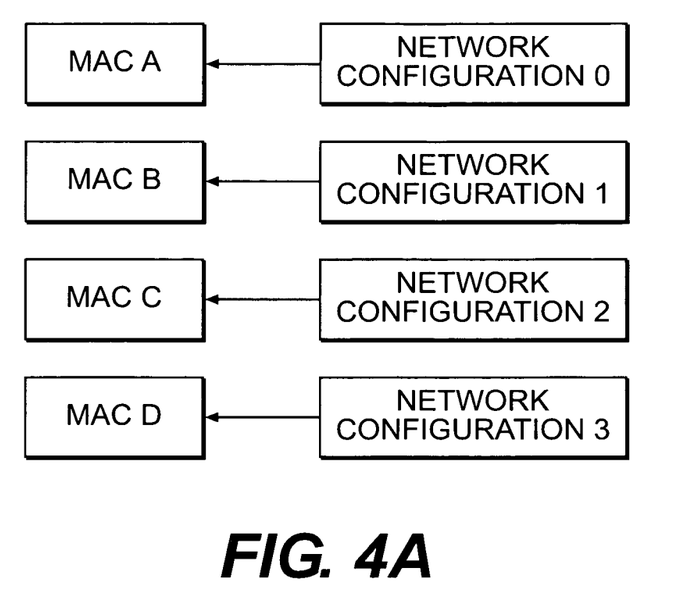
Figure 4B:
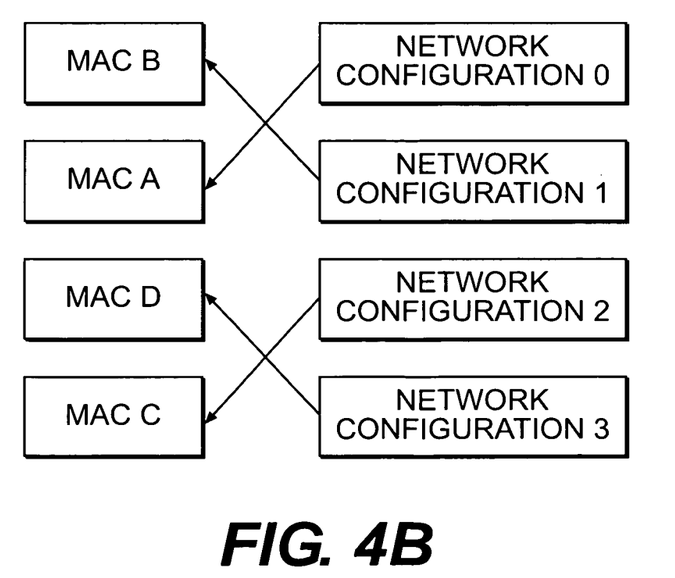

When the operating system boots on a new operating environment, it is possible that the PCI Bus will be instantiated in a different order than it was in the previous operating environment. In this situation, the MAC addresses will be present although they will be reassigned to different network configurations. When this happens, the operating system will detect a change for each NIC, orphan the network configuration, and assign the default DHCP boot protocol to the NIC. In this scenario the fix up utility 100 will reapply the network configuration that was previously applied to a particular MAC address to that particular MAC address, matching the pre-move network configuration assigned to that MAC address. FIGS. 4A and 4B illustrate how the network configurations are assigned, before and after a move; when the MAC addresses are the same; even though, the PCI Bus has been instantiated in a different order.

Figure 5:
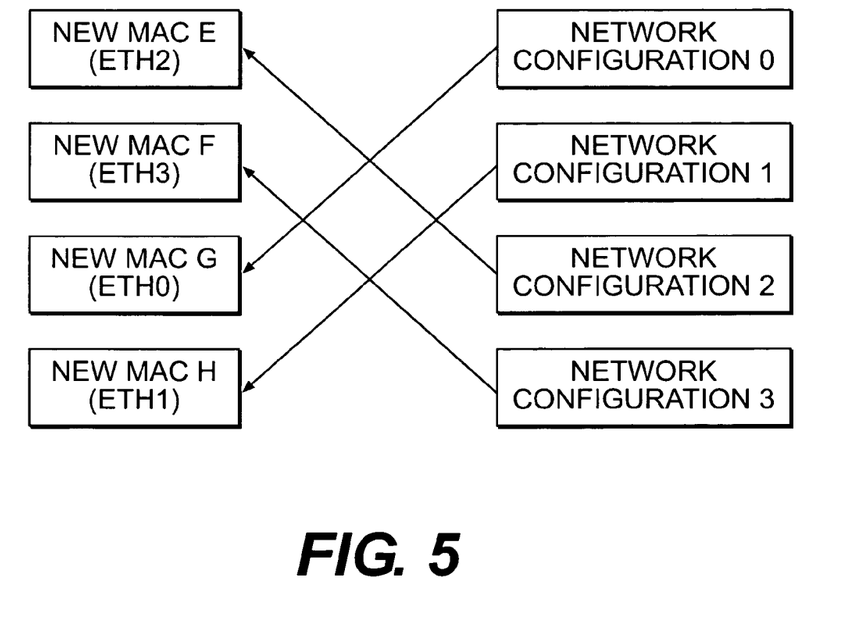
Figure 6A:
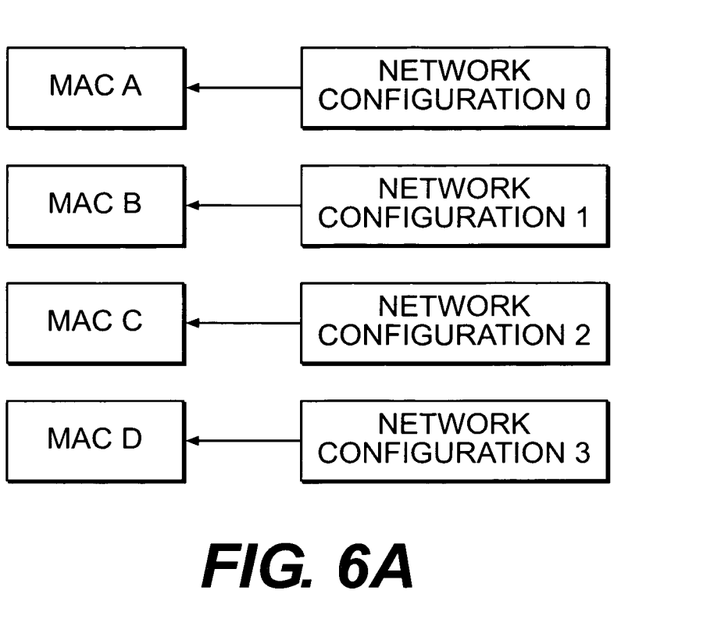
Figure 6B:
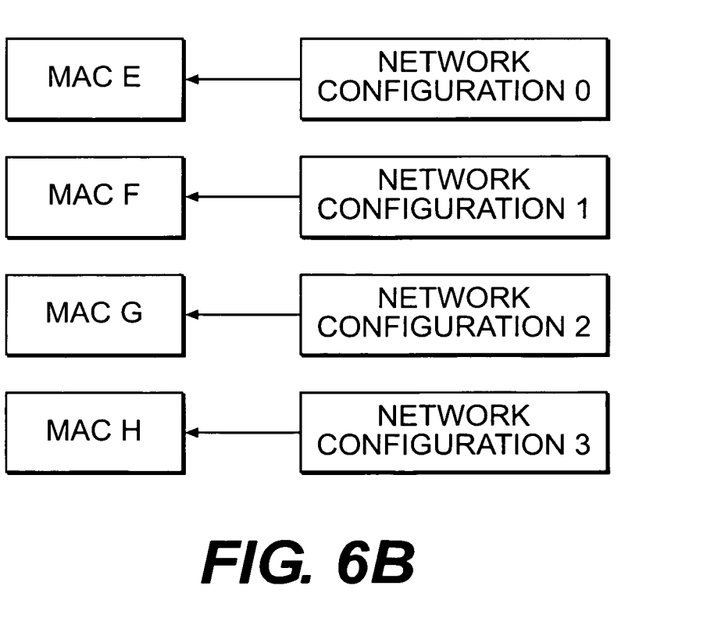

In the case of a physical to virtual or virtual to physical image move the operating system orphans network configurations assigned to NICs that do not have MAC addresses that match the MAC addresses for each network configuration. In this case the operating system sees all new MAC address and orphans all of the network configurations for each NIC found, backing up the network configuration from the previous operating environment. There are two possible solutions to this anomaly:

If the MAC address is found in the config. file 70, then the network configuration backed up by the operating system for the corresponding NIC in the config. File 70 will be assigned to the network configuration with the corresponding MAC address. For example, if the config. file 70 is modified before the image migration, the utility 100 will modify the network configuration to follow the network hardware as it is assigned in the config. File 70. FIG. 5 illustrates this configuration update scenario.

However, if the MAC address is not found in the config. file 70, then the network configuration that was backed up for a particular NIC will be applied to the network configuration for that NIC. For example, in one operating system, ifcfg-eth0.bak→ifcfg-eth0, ifcfg-eth1.bak→ifcfg-eth1 . . . ifcfg-eth(n).bak→ifcfg-eth(n). See FIGS. 6A and 6B. If there is no backup for the NIC, or the configuration has been used by another NIC, then the operating system default (i.e. DHCP) is retained. Note also that the fix up utility 100 may, in some operating system implementations, delete backed up configuration information following the configuration update.

Figure 7:
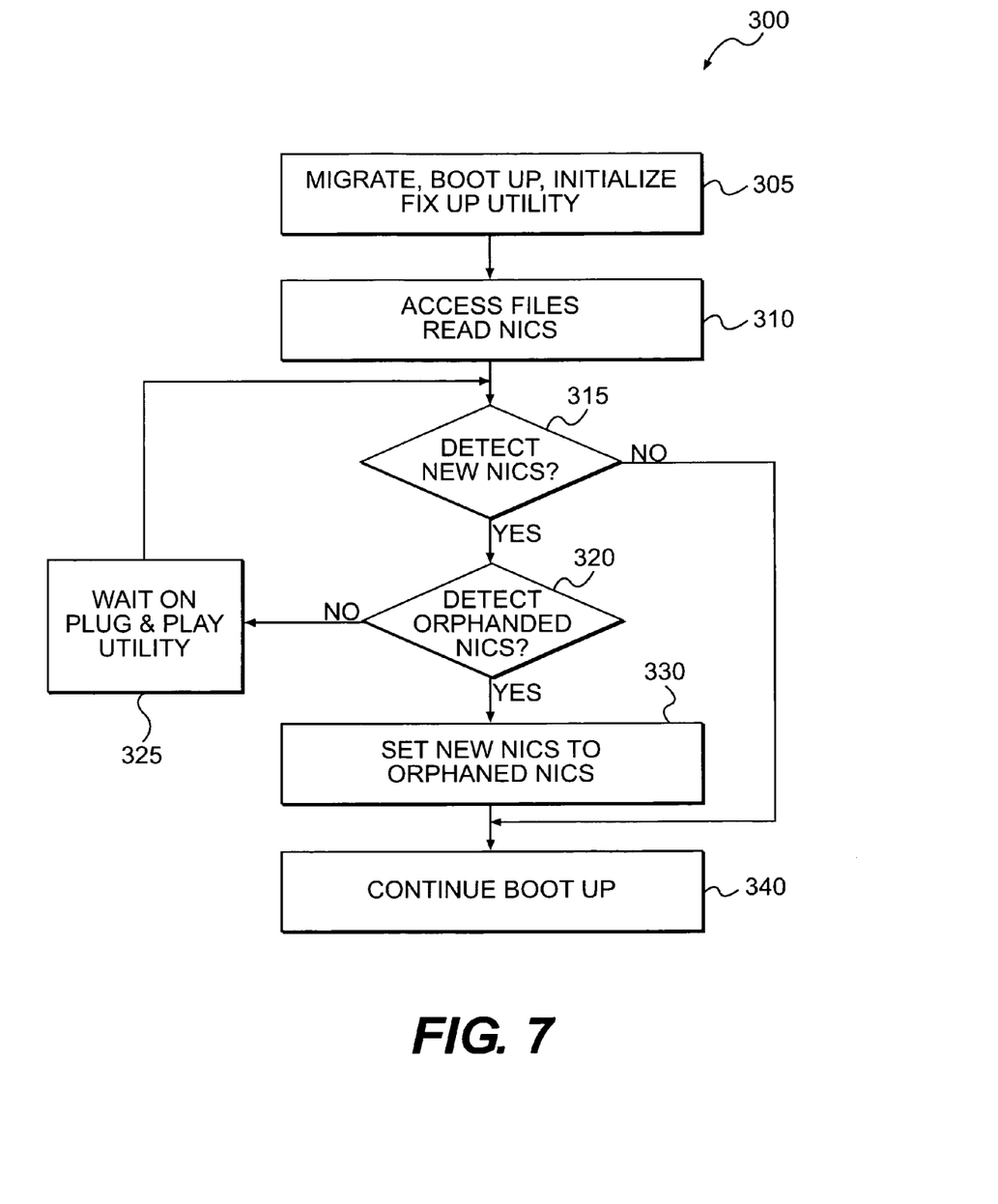
FIG. 7 is a flowchart illustrating an exemplary operation of the utility of FIG. 1.

FIG. 7 is a flowchart illustrating an exemplary network reconfiguration operation 300 executed by the fix up utility 100 of FIG. 1 in response to migration of an operating system image from a first hardware platform to a second hardware platform. More specifically, the migration algorithm 125 determines if a operating system move has occurred and if updating of the network configuration is required. In FIG. 7, the operation 300 begins, (block 305) when the operating system image 40 is migrated from the source server 20 to the target server 30, the migrated operating system image 50 is booted up, and the fix up utility 100 is initialized.

In block 310, the utility 100 accesses configuration information for the operating system 40 (for example accessing a registry and reading the network configuration information contained therein). In block 315, the utility 100 determines if any new NICs exist. If no new NICs exist, the operation 300 moves to block 340. If new NICs do exist, the operation 300 moves to block 320. In block 320, the utility 100 determines if any orphaned NICs exist. If no orphaned NICs exist, the operation 300 moves to block 325.

In block 320, if the utility 100 detects one or more orphaned NICs, the utility 100 functions to set the new NICs to match the orphaned NICs. In block 340, the bootup process continues.

We claim:

1. A method for automatically reconfiguring a computer network in response to an operating system image migration from a first hardware platform to a second hardware platform, the method implemented on a suitably programmed device, comprising:

detecting a boot up command and in response:
automatically applying an old network configuration for the migrated operating system image;
initializing a fix up utility,
creating a new network configuration for the migrated operating system image, and wherein the network configurations are created by a plug and play utility that uses dynamic host configuration protocols;
storing the new network configuration information;
reading, by the fix up utility, the new network configuration information and old network configuration information corresponding to the first hardware platform;

determining, by the fix up utility, if any of the new network configuration information corresponds to a new network interface controller and if any of the old network information corresponds to a non-assigned network interface controller; and if any of the old network configuration information corresponds to a non-assigned network interface controller, reassigning network interface controller identifiers from the old network configuration information to the new network interface controller; wherein the reassigning is contingent on the migration occurring between a virtual machine to a physical machine, or occurring between a virtual machine to a virtual machine.

2. The method of claim 1, further comprising completing the boot up command.

3. The method of claim 1, wherein the fix up utility reads the new network configuration information from one of a registry, one or more directories, and one or more local files associated with the new network interface controller.

4. The method of claim 1, wherein the operating system image is initially installed on a virtual machine of the first hardware platform.

5. The method of claim 1, wherein the operating system image is migrated to a virtual machine hosted by the second hardware platform.

6. The method of claim 1, wherein the operating system image is migrated back to the first hardware platform, and wherein the network interface controller identifiers are preserved.

7. The method of claim 1, further comprising preserving a network device media access control (MAC) address as an element of network configuration information.

8. The method of claim 7, wherein the MAC address identifies a specific network device, and wherein the network interface controller identifiers correspond to respective MAC addresses.

9. The method of claim 1, wherein the fix up utility stores the new network information with the old network configuration information.

10. A non-transitory computer readable storage medium containing thereon a set of instructions which when executed by computing platforms cause the computing platforms to implement a fix up utility on multiple computing platforms of a computer network, detecting a boot up command and in response:
automatically applying an old network configuration for the migrated operating system image;
initializing the fix UP utility,
creating a new network configuration for the migrated operating system image, and wherein the network configurations are created by a plug and play utility that uses dynamic host configuration protocols;
storing the new network configuration information;
reading, by the fix UP utility, the new network configuration information and old network configuration information corresponding to the first hardware platform;
determines if any of the current network information corresponds to a new network interface controller and if any of the backed-up network configuration information corresponds to a non-assigned network interface controller,
wherein if any of the backed up network configuration information corresponds to a non-assigned network interface controller, reassigning network interface controller identifiers from the backed up network configuration information to the new network interface controller wherein the reassigning is contingent on the migration occurring between a virtual machine to a physical machine, or occurring between a virtual machine to a virtual machine.

11. The non-transitory computer readable storage medium of claim 10, wherein the fix up utility reads the new network configuration information from one of a registry, one or more directories, and one or more local files associated with the new network interface controller.

12. The non-transitory computer readable storage medium of claim 10, wherein the operating system image is initially installed on a virtual machine of the first hardware platform.

13. The non-transitory computer readable storage medium of claim 10, wherein the operating system image is migrated to a virtual machine hosted by the second hardware platform.

14. The non-transitory computer readable storage medium of claim 10, wherein the operating system image is migrated back to the first hardware platform, and wherein the network interface controller identifiers are preserved.

15. The non-transitory computer readable storage medium of claim 10, wherein a network device media access control (MAC) address is preserved as an element of network configuration information.

16. The non-transitory computer readable storage medium of claim 15, wherein the MAC address identifies a specific network device, and wherein the network interface controller identifiers correspond to respective MAC addresses.

17. The non-transitory computer readable storage medium of claim 10, wherein the fix up utility stores the new network information with the old network configuration information.

* * * * *

UNITED STATES PATENT AND TRADEMARK OFFICE
CERTIFICATE OF CORRECTION

| | | |
|---|---|---|
| PATENT NO. | : 8,713,139 B1 | Page 1 of 1 |
| APPLICATION NO. | : 12/588844 | |
| DATED | : April 29, 2014 | |
| INVENTOR(S) | : Kasper et al. | |

It is certified that error appears in the above-identified patent and that said Letters Patent is hereby corrected as shown below:

In the Claims

Column 7, line 49, Claim 10, delete "fix UP" and insert -- fix up --, therefor.

Column 8, line 6, Claim 10, delete "fix UP" and insert -- fix up --, therefor.

Column 8, lines 17-18, Claim 10, delete "controller" and insert -- controllers --, therefor.

Signed and Sealed this
Twenty-sixth Day of August, 2014

Michelle K. Lee
*Deputy Director of the United States Patent and Trademark Office*